(12) United States Patent
Pandit

(10) Patent No.: US 8,400,942 B2
(45) Date of Patent: Mar. 19, 2013

(54) LARGE FRAME PATH MTU DISCOVERY AND COMMUNICATION FOR FCOE DEVICES

(75) Inventor: Parav Kanaiyalal Pandit, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 469 days.

(21) Appl. No.: 12/269,716

(22) Filed: Nov. 12, 2008

(65) Prior Publication Data

US 2010/0118735 A1   May 13, 2010

(51) Int. Cl.
   *H04L 12/28* (2006.01)
(52) U.S. Cl. ........ 370/254; 370/235; 370/228; 370/236; 370/474
(58) Field of Classification Search .................. 370/351, 370/395.1, 372, 474, 466, 235; 709/228, 709/236
   See application file for complete search history.

(56) References Cited

U.S. PATENT DOCUMENTS

| | | | | |
|---|---|---|---|---|
| 2004/0028051 A1* | 2/2004 | Etemadi et al. | ............ | 370/395.1 |
| 2006/0023751 A1* | 2/2006 | Wilson et al. | ................ | 370/474 |
| 2008/0028096 A1* | 1/2008 | Henderson et al. | ........... | 709/236 |
| 2009/0252181 A1* | 10/2009 | Desanti | ......................... | 370/474 |
| 2009/0292813 A1* | 11/2009 | Snively et al. | ................ | 709/228 |

OTHER PUBLICATIONS

INCITS, FIBER CHANNEL, Nov. 14, 2007, FC-BB-5, Rev 1.00.*

* cited by examiner

*Primary Examiner* — Andrew Chriss
*Assistant Examiner* — Mohamed Kamara
(74) *Attorney, Agent, or Firm* — Morrison & Foerster LLP

(57) ABSTRACT

Embodiments of the invention relate to performing network communications according to an existing protocol by using frames that are larger than those usually allowed by the existing protocol. Thus, embodiments of the present invention provide for an extension of the existing protocol which allows for the use of larger frames. The larger frames may result from the use of larger payloads and their size may be defined in terms of the payload size. Embodiments provide for use of various negotiation and initialization mechanisms of the existing protocol with additional modifications to allow for the negotiation of the use of larger frames. These modifications may provide for end to end negotiation of a larger frame or payload size. Some embodiments ensure that the negotiations are performed in such a manner that devices that feature the improvements of the present invention can communicate with devices that do not feature these improvements.

38 Claims, 7 Drawing Sheets

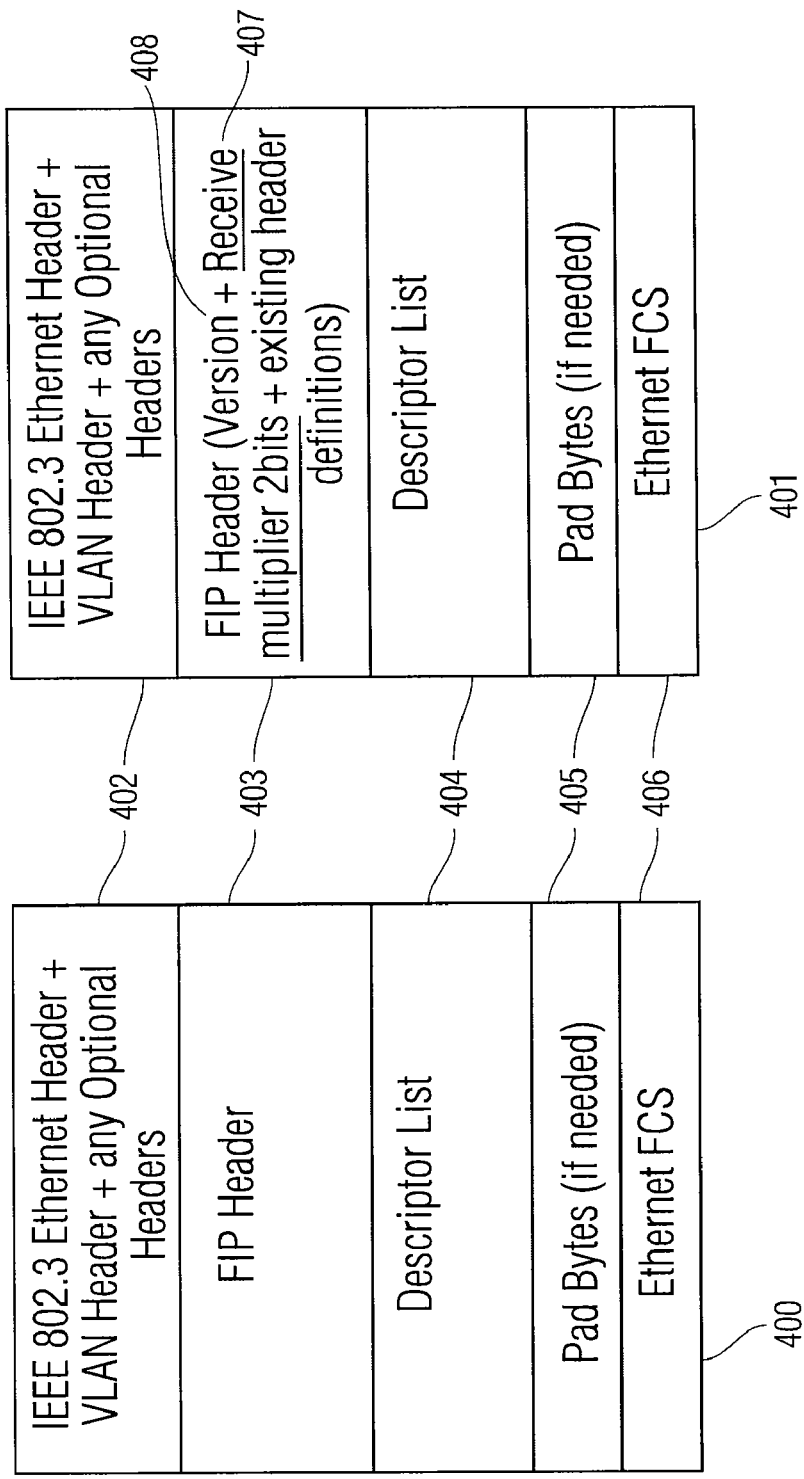

LARGE FRAME PATH MTU DISCOVERY AND COMMUNICATION FOR FCOE DEVICES

FIELD OF THE INVENTION

This relates generally to frame size selection during network communications and more specifically to performing FCoE network communications by using frames that are larger than those usually allowed by FCoE.

BACKGROUND OF THE INVENTION

Fibre Channel (FC) is a known networking protocol for high speed communications. Ethernet is another known networking protocol. As Ethernet networks have become faster and more capable another known protocol—Fibre Channel over Ethernet (FCoE) has emerged. FCoE is intended to allow FC-like communication over Ethernet networks by tunneling FC frames over Ethernet. Due to their high speed and reliability FC and FCoE are often used for storage area networks (SANs).

Both Fibre Channel and Ethernet use frames for communication. Frames are sets of data that are sequentially transmitted that include one or more header and/or trailer fields indicating various transmission related information (such as sender and recipient identification, etc.) and a data or payload field including the data that is actually being transmitted by the frame. Fibre Channel allows for variable size frames, but currently limits the data field of its frames to a maximum of 2112 bytes. This limit is also preserved in the FCoE standard. However, the Ethernet standard currently allows for larger frames, e.g., ones with frame length of up to 9000 bytes (some implementations of Ethernet that are not strictly standard compliant may allow for frames with frame length of up to 12000 bytes).

Since FCoE is often used for storage networking and thus for communications with storage devices, various sets of data that need to be transferred over FCoE are often significantly larger than the 2112 byte limit to the data field of an FCoE frame. Therefore, often multiple FCoE frames may need to be transmitted to perform a requested data transfer (e.g. a hard drive write or read operation). The use of large number of frames tends to increase latency and/or the computational requirements at the devices that transmit the frames, those that receive the frames as well as intermediary devices that forward the frames over a network. Sender devices must split data to be sent into multiple payloads for multiple frames, construct each frame and place the proper headers in it. Receiver devices must process the headers of each received frame and recombine the multiple payloads of received frames in a single data set. Intermediary devices (such as switches and routers) may need to examine the headers of each received frame to determine where to forward it to.

When to end devices set up a communication link over FC or FCoE (as well as other protocols, such as Ethernet), they usually negotiate a maximum frame size for the communications link. The maximum frame size must be such that it can be handled by both end devices, as well as any networking devices (e.g., hubs, switches, routers, etc.) which are to transport the communications between the two end devices over the network. The maximum frame size is referred to as a maximum transfer unit (MTU). The process of negotiating the maximum frame size is referred to as "path MTU discovery" as it involves discovering the MTU for the entire path of communication between the end devices. There exist path MTU discovery protocols for existing FC and FCoE protocols, however these protocols are limited to frames with maximum payload of 2112 bytes and cannot negotiate larger frames.

SUMMARY OF THE INVENTION

Embodiments of the invention relate to performing network communications according to an existing protocol by using frames that are larger than those usually allowed by the existing protocol. Thus, embodiments of the present invention provide for an extension of the existing protocol which allows for the use of larger frames. In some embodiments, the larger frames may result from increases in the payloads of the frames and the size of the frames may be defined in terms of the payloads. Embodiments provide for use of various negotiation and initialization mechanisms of the existing protocol with additional modifications to allow for the negotiation of the use of larger frames. This negotiation can be end to end— i.e. it can involve end devices that perform the communications as well as any intermediate networking devices that facilitate the communications (e.g., switches, routers, hubs, etc.). Thus, all devices that have to process communications for a particular network connection can agree on an extended frame (or payload) size that can be handled by all such devices.

Some embodiments ensure that the negotiations are performed in such a manner that devices that feature the improvements of the present invention can communicate with devices that do not feature these improvements.

BRIEF DESCRIPTION OF THE DRAWINGS

FIG. 4 is a diagram including an exemplary conventional FIP frame and an exemplary FIP frame according to embodiments of the invention.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to performing network communications according to an existing protocol by using frames that are larger than those usually allowed by the existing protocol. Thus, embodiments of the present invention provide for an extension of the existing protocol which allows for the use of larger frames. Embodiments provide for use of various negotiation and initialization mechanisms of the existing protocol with additional modifications to allow for the negotiation of the use of larger frames. Some embodiments ensure that the negotiations are performed in such a manner that devices that feature the improvements of the present invention can communicate with devices that do not feature these improvements.

While embodiments of the invention are discussed herein in conjunction with the FCoE protocol, they are not thus limited, but may apply to extending any protocol that limits frame size to allow for larger frames. Thus, embodiments of the present invention may apply to other protocols (i.e., other than FCoE) that tunnel the FC protocol over Ethernet, or protocols that tunnel the FC protocol over other types of networks, or other protocols that may not even be related to the FC protocol. The FCoE protocol may be any protocol that is known in the art to as an FCoE protocol and recognized by a person of skill in the art as applicable to the present invention. An example FCoE protocol is the on defined by the last draft of the FCoE standard developed and published by Technical Committee T11 (or T11) of the International Committee for Information Technology Standards (INCITS). The last draft noted above is referred to as the FC-BB-5 draft. However, embodiments of the present invention can also be applied to different versions/drafts of the above standard or different FCoE standards.

Figure 1:
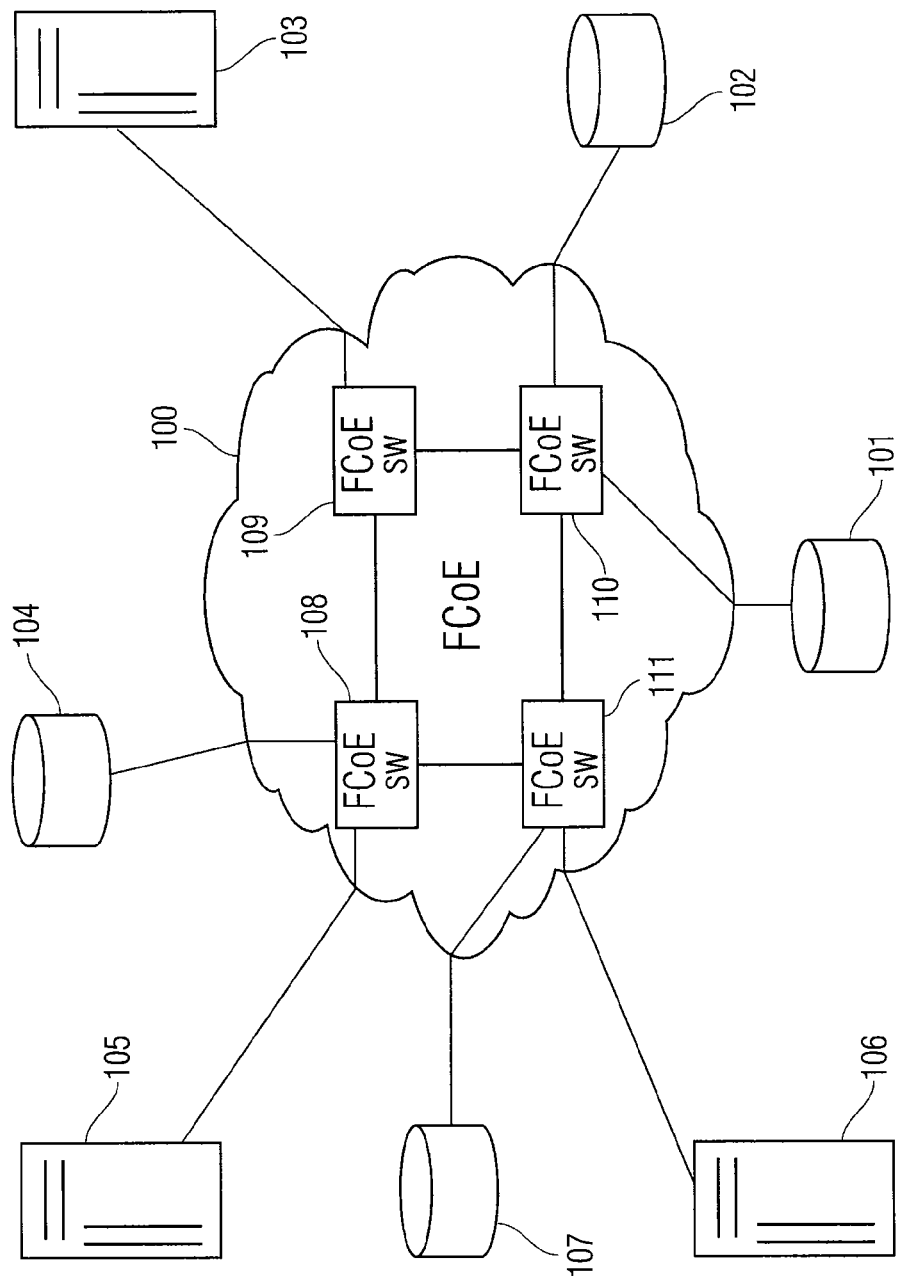
FIG. 1 is a diagram illustrating an exemplary FCoE network according to embodiments of the invention.

FIG. 1 is a diagram illustrating an exemplary FCoE network. The FCoE network 100 may include one or more FCoE switches 108-111. The FCoE switches may be together referred to as an FCoE fabric or a fabric. The FCoE network may be built on or based on an Ethernet network. Thus, the FCoE network may also include other elements (not shown), such as Ethernet (i.e., not incorporating the complete FCoE functionality or implementing partial FCoE functionality) switches, hubs routers, etc. In some embodiments, the FCoE network may be based on a standard Ethernet network. In other embodiments, the FCoE network may be based on an enhanced version of Ethernet such as, for example, converged enhanced Ethernet (CEE).

Various FCoE devices 101-107 can be connected to the FCoE network. These may include initiators 103, 105 and 106 and targets 101, 102, 104 and 107. The initiators usually initiate communications over FCoE with targets. The initiators can be computers such as storage servers. The targets can be storage devices, such as hard drives, RAID arrays, tape drives, solid state storage devices, etc. However, this need not be the case. For example, in some embodiments, a target may be a computer as well. In some embodiments, a single device can act as an initiator and a target in different communication sessions. Thus, in general, devices 101-107 are FCoE capable electronic devices and need not be storage devices and computers as shown in FIG. 1.

An initiator (such as initiator 105) can access a target (such as target 101) through the FCoE fabric to read data and/or store data. Again, in alternative embodiments, targets can be accessed for entirely different reasons. If the communications are performed according to the conventional FCoE protocol and relatively large amount of data is transferred, the 2112 byte limit on the data field of the conventional FCoE frame can, as discussed above, cause the initiator, the target and the fabric to perform a relatively high amount of processing in order to create, transmit and receive a relatively high amount of frames. If, however, the initiator, the target and the fabric are implemented according to the present invention, they may be able to use larger frames and thus can reduce the number of frames and amount of processing required to transmit them.

Figure 2:
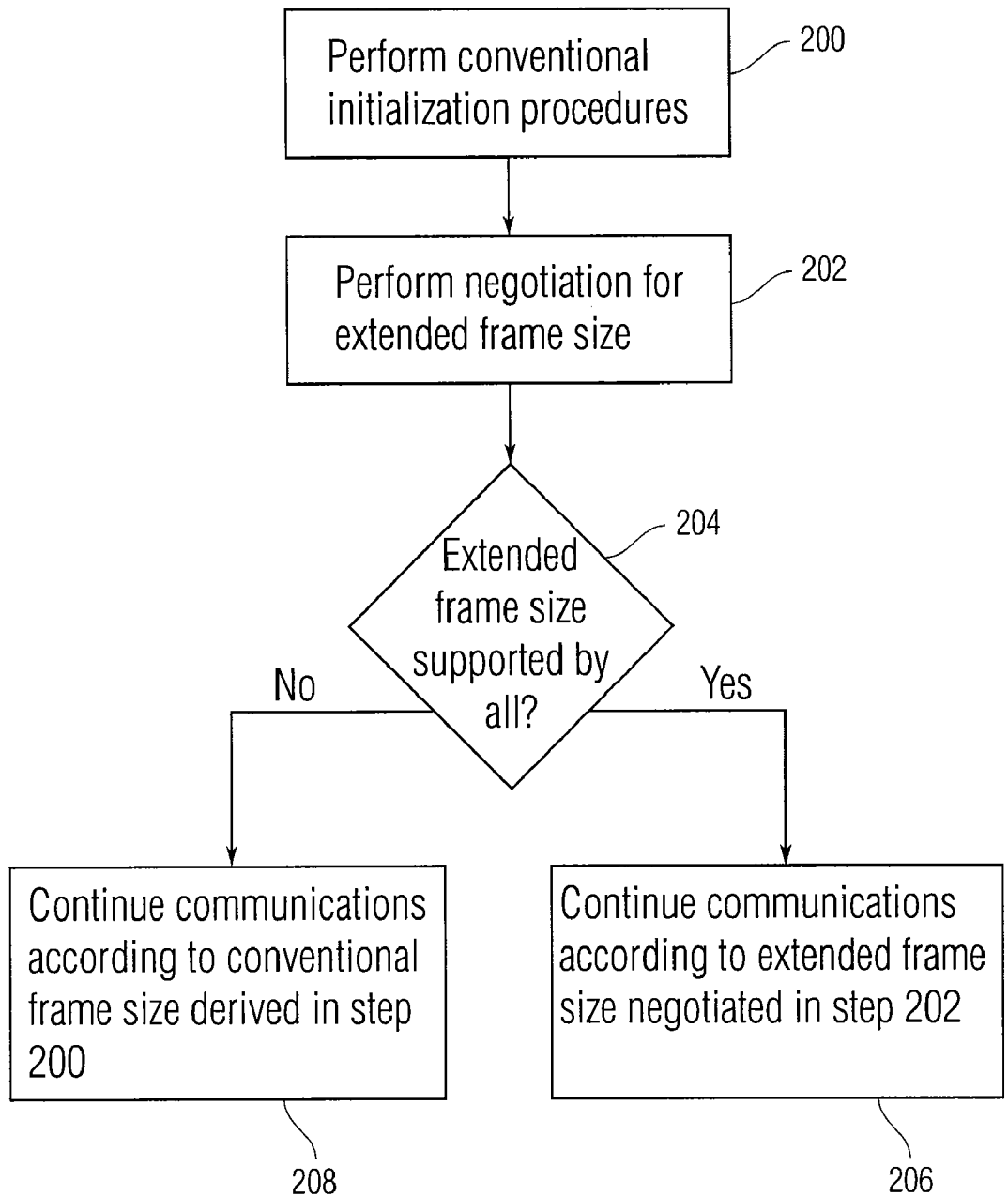
FIG. 2 is a flowchart showing an exemplary method for performing communications according to embodiments of the present invention.

FIG. 2 is a flow chart showing an exemplary general method for communication according to embodiments of the present invention. At step 200, the initiator, the target and the fabric perform conventional initialization procedures according to the underlying protocol used. In the present example, the underlying protocol is FCoE. In step 202, the initiator, the target and the fabric perform negotiation for defining a maximum extended frame size to be used. The negotiations of step 202 are usually not defined by the underlying protocol (e.g., FCoE) as they are negotiations for frame size that may be larger than the maximum allowed by the underlying protocol (e.g., 2112 bytes). At step 204, it is determined whether extended frame size communication is supported by all parties to the communication (i.e., the initiator, the target and the fabric). This determination may be based on the negotiations during step 202. If it is supported, communication proceeds according to the extended frame size negotiated in step 202. If one or more of the initiator, target and fabric do not support the extended frame size, then communications continue according a conventional frame size determined during the conventional initialization procedure performed in step 200 (step 208).

Thus, embodiments of the invention may allow for the use of higher frame size when possible (i.e., when all parties to the communication implement the present invention) but may revert to conventional communication when necessary (i.e., when legacy devices and/or native FC devices that do not implement the present invention are present).

In some embodiments, the two steps of initialization 200 and 202 may be combined. Thus, devices and the fabric may negotiate for the extended frame size while performing conventional negotiation and initialization according to the underlying protocol. A particular embodiment of this type is described in more detail below with reference to FIGS. 3A and B.

Figure 3A:
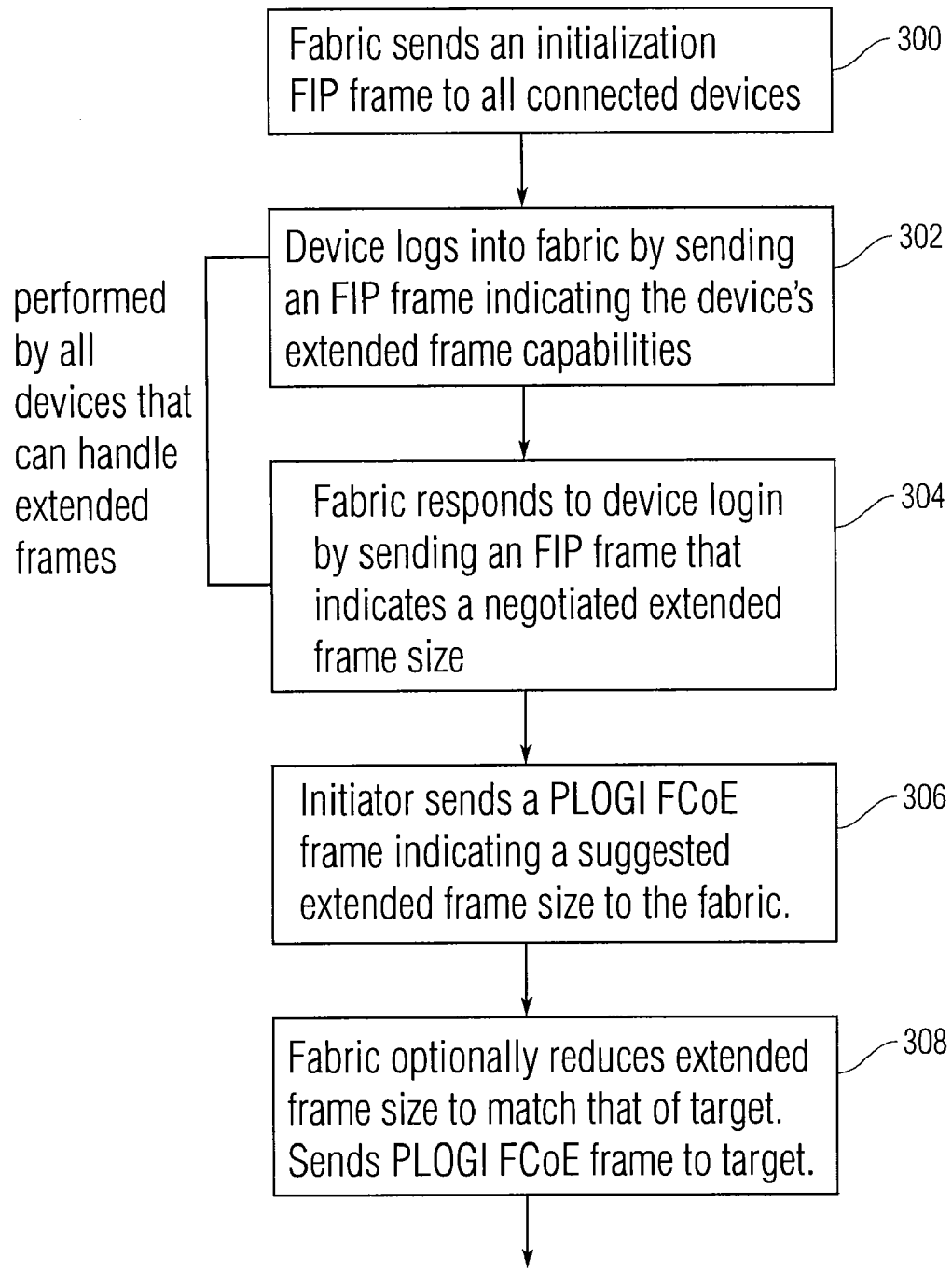
FIGS. 3A and B include another more detailed flowchart showing an exemplary method for performing communications according to embodiments of the present invention.

At step 300 of FIG. 3A, the FCoE fabric sends an initialization FIP frame to all connected devices. The term "FIP" refers to FCoE initialization protocol. FIP is a known protocol generally used in conventional FCoE networks in order to initialize connections. The FIP protocol is usually performed by sending and receiving FIP frames as defined by the protocol. These FIP frames may correspond to or include a FIP advertisement, FIP solicitation, fabric login (or FLOGI) request or response as defined by the FC protocol.

FIG. 4 shows a couple of exemplary FIP frames. Frame 400 is a conventional FIP frame, while frame 401 is an FIP frame modified according to embodiments of the invention. Fields 402-406 of both frames are known and defined by the existing FIP standard (as well as by the Ethernet standard). The descriptor lists 404 of both frames include various initialization information including a field specifying the payload size a device that sends the FIP frame is capable of handling. This latter field indicates a conventional payload size, or a payload size according to the existing FCoE protocol. Thus, the value held by this field may be referred to as ConvPyLdSize. Devices that can handle extended size frames according to embodiments of the present invention may be able to handle payload sizes larger than those indicated by the ConvPyLdSize value they place in their FIP frames as discussed in more detail below.

The main difference of the new FIP frame 401 from frame 400 is that it includes some additional header definitions in FIP header field 403. In this embodiment, the FIP frame includes a receive multiplier field 407 which is not present in frame 400. The receive multiplier field can be used to indicate an extended payload size, as discussed below in more detail. In the presently discussed example, the received multiplier field is two bits long; however, this is not required for all embodiments.

The receive multiplier field can be positioned in such a manner in the FIP header, so that conventional devices that do not implement and are not aware of the present invention will always create FIP frames that include a known string, such as a set of zeroes ("0,0") as the receive multiplier field.

Referring back to FIG. 3A, the initialization FIP frame sent by the FCoE fabric in step 300 may include (1,1) as its receive multiplier field. When sent to all devices as FIP advertisement or solicitation, or when sent as a FIP solicitation frame to a specific device, this frame may indicate to devices implementing the present invention that the FCoE fabric and/or the FCOE first and second devices implement the present invention. Conventional FCoE devices that do not implement the present invention ignore the additionally defined fields of the FIP frame.

If a device that implements the present invention (e.g., initiator 105 or target 101 of FIG. 1) wishes to communicate over the FCoE network 100, then the device may login to the FCoE fabric 100 (step 302). The device may login to the fabric according to the FIP protocol by sending the fabric an FIP frame that represents a FLOGI request. However, in addition to the usual information required by the FIP protocol, the FIP frame of step 302 can include an additional value in the receive multiplier field which indicates the size of an extended frame the device may be capable of handling. More specifically, the receive multiplier of the FIP frame may include one of the following three sets of bits—(0,0), (0,1) or (1,0). The size of an extended frame the device can handle can be defined in terms of the size of an extended payload in the extended frame by the following equation:

$$\text{ExtPyLdSize} = 2^{RM} \cdot \text{ConvPyLdSize}, \quad (1)$$

where the ExtPyLdSize indicates the extended payload size the device is capable of handling and ConvPyLdSize indicates the payload size the device conventionally advertises as being able to handle in the FIP frame. RM is the binary value of the receive multiplier field of the new FIP frame 401.

Thus, for example, if a device can handle an extended payload of 4224 bytes, it can send out an FIP frame that indicates the maximum ConvPyLdSize of 2112, and a receive multiplier of (0,1), or 1 in decimal. Equation (1) would result in an extended payload size of 4224. In another example if a device can handle an extended payload of 8448 bytes, it can send an FIP frame that again indicates the maximum ConvPyLdSize of 2112 but includes an RM value of (1,0) or 2 in decimal. In this case, Eq. (1) would result in 8448 bytes.

It should be noted that in the presently discussed embodiments, the maximum extended payload size is 8448 because, as discussed above, only values of (0,0), (0,1) and (1,0) are allowed for the receive multiplier field during step 302. This may be sufficient for some FCoE embodiments, because FCoE uses Ethernet frames and the frame length of the Ethernet frames is limited to 9000 bytes. Thus, FCoE cannot exceed this limit unless the Ethernet standard is modified to include larger frames as well. Alternative embodiments may feature larger extended payload sizes.

Furthermore, while the above examples show the extended payload size defined by a FIP frame being varied by solely varying the RM value, this need not be the case. For example, if a device can handle an extended payload size of 4000 bytes, it can indicate that by setting the ConvPyLdSize value to 2000 and the RM value to (0,1).

At step 304, the fabric responds to the device's login by sending an FIP frame to the device as an acknowledgement. The FIP frame sent by the fabric can include a negotiated extended payload size. The negotiated extended payload size can be the smaller of the payload size sent by the device in step 302 and the largest payload size that the fabric can handle. Thus, the negotiated payload size is a payload size that can be handled by both the device and the fabric. The FIP frame sent by the fabric may also include other conventional data as specified by the existing FCoE protocol.

Steps 302 and 304 can be performed by all devices connected to the FCoE network 100 that implement an embodiment of the present invention and wish to communicate over the FCoE network. Thus, these steps can be performed by both targets and initiators. After steps 302 and 304 are performed by a plurality of devices, there may exist one or more negotiated extended payload sizes corresponding to different devices and their respective negotiations with the fabric in steps 302 and 304.

It should be noted that during steps 302 and 304 negotiation as to the size of the extended frame is performed while simultaneously performing conventional initialization and negotiation according to the existing FCoE protocol. Accordingly, the FIP frames being transmitted during steps 302 and 304 include both conventional initialization information as defined by the FCoE protocol and information as to the size of the extended frame as required by embodiments of the present invention. Thus, FIG. 3 shows an example in which the steps 200 and 202 of FIG. 2 are performed simultaneously.

According to the FC and FCoE protocols, if an initiator wishes to communicate with a target after the initial fabric login, it logs into the target itself. This is referred to as port login. According to the FCoE protocol, an initiator performs a port login by sending a predefined type of FCoE frame. The type of FCoE frame may include or be analogous to a port login (PLOGI) request in the FC protocol.

Figure 5:
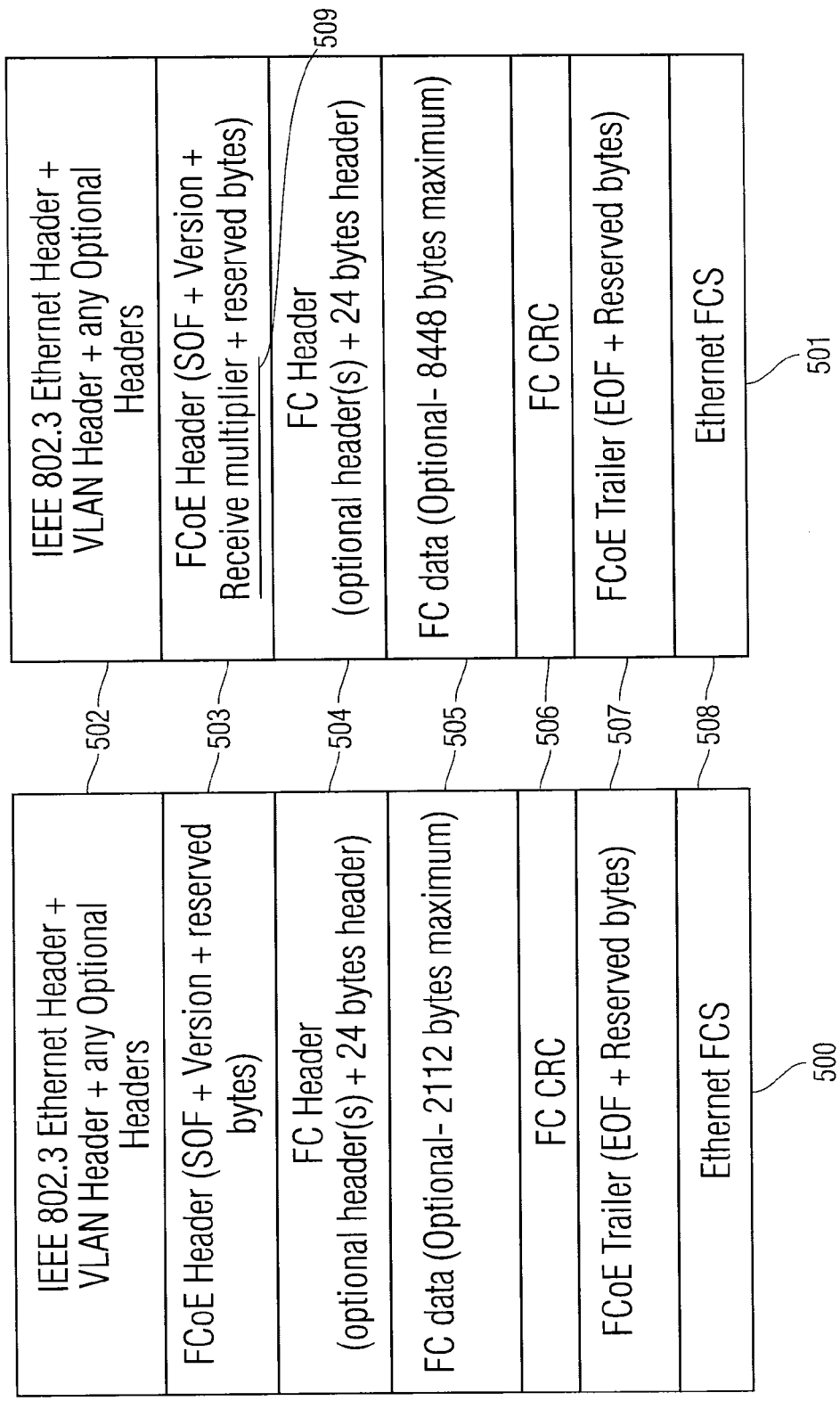
FIG. 5 is a diagram including an exemplary conventional FCoE frame and an exemplary FCoE frame according to embodiments of the invention.

FIG. 5 is a diagram showing a conventional FCoE frame 500 and an FCoE frame according to embodiments of the present invention 501. Frames 500 and 501 can be frames that include PLOGI requests as discussed above. Fields 502-508 are known and defined in the FCoE and/or Ethernet standards. The major difference between the two frames is that new frame 501 includes an additional field within the FCoE headers field 503. This is again the receive multiplier or RM field 509. The RM field can be similar to that of the FIP frame 401. More specifically, it can be made of two bits and can be positioned in such a manner so that for conventional FCoE frames (such as frame 500) the values associated with the RM field are always zero. As noted above, in other embodiments the RM field can be of different size. Furthermore, a conventional payload size value ConvPyLdSize can be stored in the FC Header field 504 of the FCoE frame.

Referring back to FIG. 3A, in step 306, an initiator that implements the invention (such as initiator 105 of FIG. 5) and needs to communicate with a target (such as target 101) sends an FCoE frame to the target. The FCoE frame is a PLOGI FCoE frame or, in other words, it is an FCoE frame that includes a PLOGI request. The FCoE frame is addressed to the target but is initially sent to the FCoE fabric which is to forward it to the target.

The PLOGI FCoE frame includes frame size information (or, more accurately, payload size information) indicating a suggested extended payload size. The suggested extended payload size can be, for example, the payload size that was negotiated for the initiator in steps 302 and 304. However, in certain circumstances, the initiator can suggest a smaller payload size than the one negotiated in steps 302 and 204 in frame 306. For example, the initiator may determine that a smaller payload size may be preferable for the communications that are being initiated.

The extended payload size can be defined in the PLOGI FCoE frame based on the RM bits and the conventional payload size (ConvPyLdSize) stored in that frame. These values can be inserted in Equation (1) above to arrive at the extended payload size. Thus, the extended payload size can be encoded in an FCoE frame in a manner similar to its encoding in an FIP frame discussed above.

In step 308 of FIG. 3A, the fabric forwards the PLOGI FCoE frame received from the initiator to the target specified in that frame. Before forwarding, the fabric may optionally reduce the payload size indicated in the PLOGI FCoE frame to match the maximum payload size negotiated between the fabric and the target in steps 302 and 304. Thus, for example, the initiator and the fabric may negotiate the maximum payload size of 8448 during steps 302 and 304 and the target may negotiate a smaller payload size of 4224 with the fabric during its own iteration of steps 302 and 304. If then the initiator sends a PLOGI FCoE frame indicating a payload size of 8448 to the fabric, the fabric may note that the target negotiated a smaller size of 4224 (indicating that is the maximum size the target can handle for communications through the fabric), and may as a result reduce the payload size indicated by the PLOGI FCoE frame before forwarding that frame to the target.

Figure 3B:
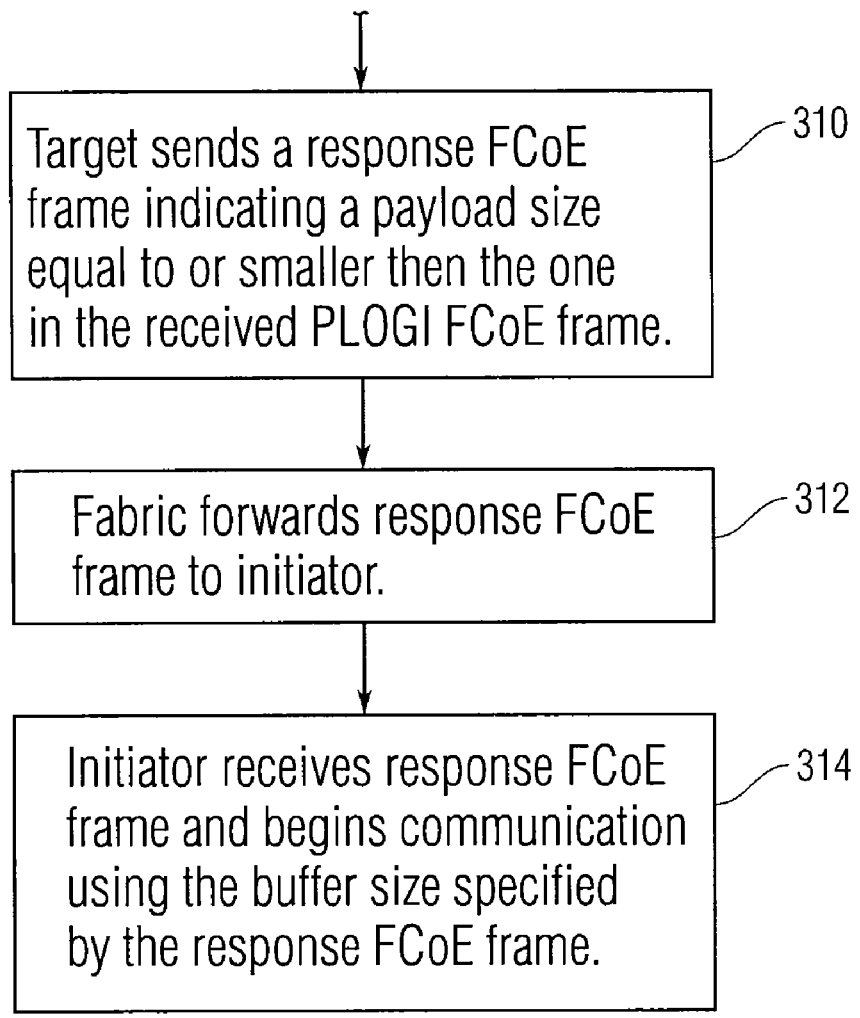

In step 310 of FIG. 3B, the target has received the PLOGI FCoE frame and sends an FCoE frame in response to the PLOGI FCoE frame. The response frame may include a response to the PLOGI request defined by the received PLOGI FCoE frame. The response frame may be an FCoE frame composed in accordance with existing FCoE protocols and may include a PLOGI response (or acknowledgement) that is in accordance with existing Fibre Channel protocols.

However, the response or acknowledgement FCoE frame may include additional information defining a suggested buffer size. The suggested buffer size may be defined in a manner similar to that used by the PLOGI FCoE frame of step 306. Thus, the response FCoE frame may include an RM value and a ConvPyLdSize value which together may define the suggested buffer size according to Equation (1) above.

The response FCoE frame may define the same suggested pay load size value as the one defined by the PLOGI FCoE frame received by the target. However, if the target, for various reasons wishes to use a smaller pay load size, it can define a smaller suggested buffer size in the response FCoE frame. Reasons for using a smaller buffer size may include, for example, temporary inability to use a larger buffer due to a temporary lack of resources.

In step 312, the fabric forwards the response FCoE frame to the initiator (said frame having been addressed to the initiator by the target). In step 314, the initiator receives the response FCoE frame and begins communications using the buffer size specified by the response FCoE frame. These communications can include, for example, a request to read and/or write data from/to a storage drive. The target can respond using the same buffer size. Thus, the buffer size included in the response FCoE frame can be considered to be a final negotiated buffer size. Communications can continue using that buffer size as long as the logical connection between the initiator and the target persists. Once the connection is torn down, a new connection may be set up (by having the initiator issue a new PLOGI FCoE frame) and a new extended buffer size can be negotiated when setting up the new connection.

Thus, the process of steps 302-314 simultaneously performs two functions—it sets up an FCoE connection between the target and the initiator according to known FCoE protocols and at the same time it negotiates an extended frame size (or extended buffer size) in accordance with embodiments of the present invention.

Furthermore, some embodiments of the invention ensure that the process of negotiation is transparent to legacy devices and/or native FC devices that do not feature the present invention and that it defaults to buffer sizes that are safe for such legacy devices and/or native FC devices when such devices are present. Thus, for example, the embodiment discussed above partially stored the extended buffer size in the RM field. The RM field may be specifically placed in an area of the FCoE frame that is known to always store '0's for legacy devices and/or native FC devices. Thus, when setting up a connection, a legacy device and/or native FC device will always issue FCoE frames with RM field of 0, which, according to Equation (1), would make the suggested size equal to the ConvPyLdSize specified by the frame. Thus, the legacy device and/or native FC device will always suggest using the conventional pay load size, or the pay load size as defined by conventional protocols. Other devices will not exceed that size, even if they do implement the present invention, and will thus operate according to the conventional protocols when communicating with a conventional device. Thus, embodiments of the present invention are compatible with legacy devices and/or native FC devices that may not implement the present invention. This is true for legacy end devices (i.e., initiators and targets), as well as for devices that are part of the fabric (i.e., FCoE switches, routers, etc.)

But when two communicating devices and the fabric do implement the present invention, they can communicate using much higher payload sizes than previously possible under the FCoE protocol and can thus reduce network overhead, reduce latency and improve throughput speeds.

Figure 6A:
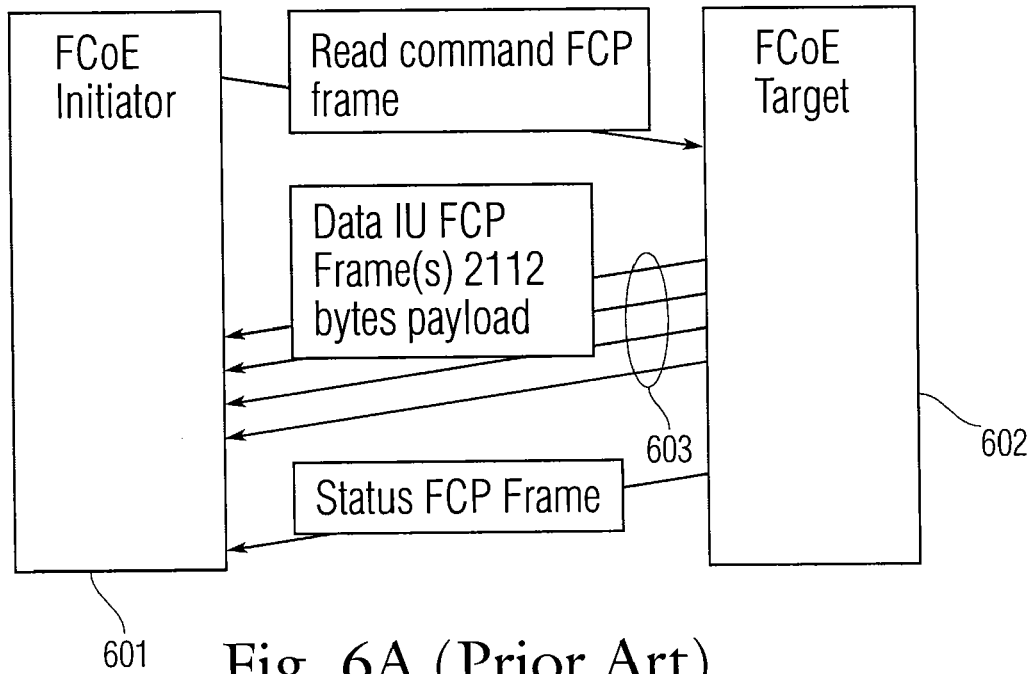
FIGS. 6A and 6B are diagrams showing exemplary communication between two devices that illustrate some of the advantages of embodiments of the present invention.
Figure 6B:
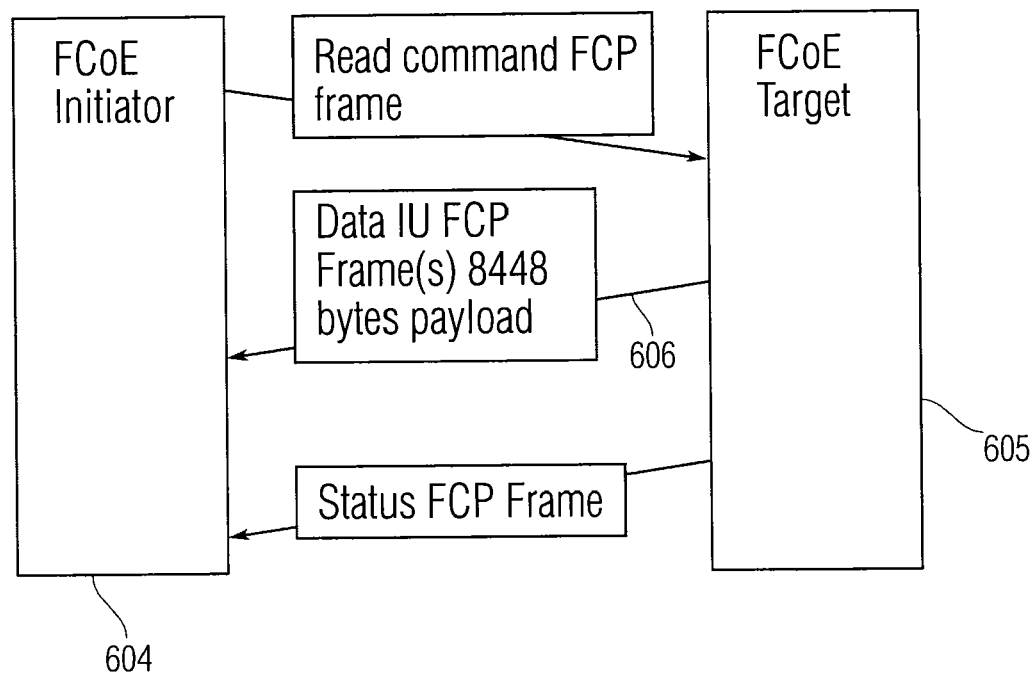

FIGS. 6A and 6B are diagrams showing communication between two devices that illustrate some of the advantages of embodiments of the present invention. More specifically, FIG. 6A shows conventional communication between conventional FCoE devices 601 and 602. This communication may require four data frames 603 with payload of 2112 each to perform a single exemplary read command. FIG. 6B, on the other hand, illustrates communication according to embodiments of the present invention between devices 604 and 605 that implement such embodiments. In the communication of FIG. 6B, a single data frame 606 with a payload of 8448 may be used to perform the same exemplary read command. As noted above, this can reduce network processing overhead and improve networking performance.

It should be noted that FIGS. 6A and 6B do not show the fabric or various frames that are exchanged when setting up the connection.

While the above discussed embodiments provide for initiator to target frame size negotiation, this need not be the case. Some more advanced embodiments of the invention may include aggregator switches in the fabric that may allow two end devices to communicate using different frame (or pay load) sizes. For example, a first device using a pay load size of 8448 bytes can communicate with a second device using a payload size of 2112 bytes. The aggregator switch may split frames originating from the first device into multiple frames with smaller payload sizes and send them to the second device. Similarly, the aggregator switch may combine frames originating from the second device into fewer frames with larger payloads and send these to the first device. The aggregator switch may also pad payloads as needed to get the correct payload sizes.

In some embodiments, the aggregator switch can be transparent to the end devices. In other words, the aggregator switch may behave in such a manner that it appears to each end devices that it is communicating with a compatible device and there is no mismatch of payload sizes. Thus, the aggregator switch may be configured to modify the suggested payload sizes passed between the two end devices during the initialization process of FIGS. 3A and 3B so that each end device believes it is communicating with another device that is capable of handling the same payload size as it.

An aggregator switch may be especially useful when combining an FCoE fabric that implements the present invention with one that does not. Thus, the aggregator switch can allow the benefits of the present invention to be better utilized in that situation instead of having various devices that implement the invention default to low payload sizes when communicating with conventional devices.

Furthermore, the aggregator switch may be useful when connecting an FCoE network that implements embodiments of the invention with an FC network that does not. Thus, the aggregator switch functionality may be built into an FCoE/FC bridge.

The discussion above mentions various devices such as computers, storage drives, initiators, targets and switches (e.g., the switches that form the fabric). Exemplary behavior and actions of these devices are discussed. The devices may be designed to perform such behavior in one or more ways known in the art. For example, one or more of the devices may include one or more processors. Each processor can be a central processing unit (CPU), an embedded processor, a digital signal processor, a controller, etc. Each of the processors may be connected to a computer readable medium, such as a memory or a storage medium. The memory can be, for example RAM, ROM, EPROM, FLASH, etc. The storage medium can be a hard drive, a disk drive, a tape drive, a flash drive, an optical drive. The storage medium may include software or firmware comprising instructions executable by the processor. The processor may execute the instructions to allow the device to perform the functions discussed above as well as other functions. Alternatively or in addition, some or all of the functions of the device can be performed by application specific circuitry instead of a programmable processor.

The functionality discussed above can be performed by the main CPU of a device (if the device includes one), or by a secondary processor or logic of the device. For example, if one of the devices discussed above is a computer, the functionality discussed above can be performed by the main CPU of the computer, or by a controller of a host bus adapter (HBA) or network interface card (NIC) of the computer.

Embodiments above are discussed in terms of controlling or modifying the payload size of various frames. It is noted that since the payload is part of the frame, the payload directly affects the frame size. Thus controlling or modifying the payload of a frame results in controlling and modifying the frame size of the frame. Therefore, controlling and modifying the payload can be considered a special case for controlling and modifying the frame size. While some embodiments control the frame size by controlling the payload size (as discussed above), other embodiments may control the frame size directly, i.e., by directly referring to a frame size during initialization, instead of only referring to a payload size.

A person of skill in the art would recognize that various variations of embodiments discussed above can be made. For example, the negotiation process of FIGS. 3A and 3B can be modified. The way the extended payload size is defined in various frames can also be modified. Furthermore, as noted above, embodiments of the invention are not only limited to FCoE and can be used in conjunction with various other networking protocols.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A system comprising:
   a Fibre Channel over Ethernet (FCoE) network comprising an FCoE fabric;
   a first device connected to the FCoE network; and
   a second device connected to the FCoE network,
   wherein the first device, the second device and the FCoE fabric are configured to negotiate a frame size larger than allowed by existing FCoE standards, and the first and second devices are configured to communicate through the FCoE network using frames of the negotiated frame size.

2. The system of claim 1, wherein negotiating a frame size larger than allowed by existing FCoE standards is defined by negotiating a payload size larger than allowed by existing FCoE standards.

3. The system of claim 1, further including a legacy device and/or native FC device, wherein the legacy device and/or native FC device is incapable of handling frames of size larger than allowed by existing FCoE standards, the first device, the legacy device and/or native FC device and the FCoE fabric being configured to negotiate a frame size in accordance with the existing FCoE standards for communications between the first device and the legacy device and/or native FC device.

4. The system of claim 1, wherein the first device, the second device and the FCoE fabric are configured to negotiate a frame size larger than allowed by existing FCoE standards while they perform connection initialization operations specified by the existing FCoE standards.

5. The system of claim 4, wherein the connection initialization operations specified by the existing FCoE standards are one or more operations selected from a group consisting of FIP advertisement, FIP solicitation, fabric login (FLOGI) and port login (PLOGI), as well as FDISC and other NPIV (N_Port ID Virtualization) login operations.

6. A method for operating a networked system including at least a first and second device connected to a Fibre Channel over Ethernet (FCoE) network including an FCoE fabric the method comprising:
   negotiating a frame size between the first device, the second device and the FCoE fabric, the negotiated frame size being larger than allowed by existing FCoE standards; and
   communicating between the first and second devices through the FCoE network using frames of the negotiated frame size.

7. The method of claim 6, wherein negotiating a frame size larger than allowed by existing FCoE standards is defined by negotiating a payload size larger than allowed by existing FCoE standards.

8. The method of claim 6, wherein the network further includes a legacy device and/or native FC device incapable of handling frames of size larger than allowed by existing FCoE standards, the method further including
   negotiating a second frame size for communication between the first device and the legacy device and/or native FC device by the first device, the second device and the FCoE fabric, the second frame size being in accordance with the existing FCoE standards;
   communicating between the first device and the legacy device and/or native FC device through the FCoE network using the second frame size.

9. The method of claim 6 further including performing connection initialization operations specified by the existing FCoE standards by the first device, the second device and the FCoE fabric, said connection initialization operations taking place while the first device, the second device, and the FCoE fabric are negotiating a frame size larger than allowed by existing FCoE standards.

10. The method of claim 9, wherein the connection initialization operations specified by the existing FCoE standards are one or more operations selected from a group consisting of FIP advertisement, FIP solicitation, fabric login (FLOGI) and port login (PLOGI), as well as FDISC and other NPIV (N_Port ID Virtualization) login operations.

11. The method of claim 10, wherein the performance of connection initialization operations specified by the existing FCoE standards and the negotiation of the frame size larger than allowed by existing FCoE standards include sending one or more initialization frames specified by the existing FCoE standards as being part of the connection initialization operations, said frames including an additional field that is not specified by the existing FCoE standards, said additional field at least partially defining a suggested frame size that is larger than allowed by existing FCoE standards.

12. The method of claim 11, wherein the one or more initialization frames include at least one of the group consisting of: an FIP frame, an FCoE frame including a PLOGI request and an FCoE frame including a PLOGI response.

13. The method of claim 11, wherein the suggested frame size that is larger than allowed by existing FCoE standards is defined by defining a suggested payload size larger than allowed by existing FCoE standards.

14. The method of claim 13, wherein the suggested payload size that is larger than allowed by existing FCoE standards is defined by the use of the additional field in conjunction with a conventional field that is part of the frame, the conventional field storing a payload size that is allowed by existing FCoE standards.

15. The method of claim 14, wherein the suggested payload size that is larger than allowed by existing FCoE standards is defined in terms of a predefined mathematical formula based on the values held in the additional field and the conventional field.

16. The method of claim 15, wherein the additional field is associated with a default value, the default value being a value usually placed in that field by conventional devices, the predefined mathematical formula being such that if the default value is stored in the additional field, the predefined formula results in a payload size that is equal to the payload size stored by the conventional field.

17. A method performed by a device connected to a Fibre Channel over Ethernet (FCoE) network including an FCoE fabric the method comprising:
negotiating a frame size with a second device and the FCoE fabric, the negotiated frame size being larger than allowed by existing FCoE standards; and
communicating with the second device through the FCoE network using frames of the negotiated frame size.

18. The method of claim 17, wherein negotiating a frame size larger than allowed by existing FCoE standards is defined by negotiating a payload size larger than allowed by existing FCoE standards.

19. The method of claim 17, wherein the network further includes a legacy device and/or native FC device incapable of handling frames of size larger than allowed by existing FCoE standards, the method further including
negotiating a second frame size with the legacy device and/or native FC device and the FCoE fabric for communication with the legacy device and/or native FC device, the second frame size being in accordance with the existing FCoE standards;
communicating with the legacy device and/or native FC device through the FCoE network using the second frame size.

20. The method of claim 17 further including performing connection initialization operations specified by the existing FCoE standards, said connection initialization operations taking place while negotiating a frame size larger than allowed by existing FCoE standards.

21. The method of claim 20, wherein the connection initialization operations specified by the existing FCoE standards are one or more operations selected from a group consisting of FIP advertisement, FIP solicitation, fabric login (FLOGI) and port login (PLOGI), as well as FDISC and other NPIV (N_Port ID Virtualization) login operations.

22. The method of claim 21, wherein the performance of connection initialization operations specified by the existing FCoE standards and the negotiation of the frame size larger than allowed by existing FCoE standards include sending one or more initialization frames specified by the FCoE standards as being part of the connection initialization operations, said frames including an additional field that is not specified by the existing FCoE standards, said additional field at least partially defining a suggested frame size that is larger than allowed by existing FCoE standards.

23. The method of claim 22, wherein the one or more initialization frames include at least one of the group consisting of: an FIP frame, an FCoE frame including a PLOGI request and an FCoE frame including a PLOGI response.

24. The method of claim 22, wherein the suggested frame size that is larger than allowed by existing FCoE standards is defined by defining a suggested payload size larger than allowed by existing FCoE standards.

25. The method of claim 24, wherein the suggested payload size that is larger than allowed by existing FCoE standards is defined by the use of the additional field in conjunction with a conventional field, the conventional field that is part of the frame, the conventional field storing a payload size that is allowed by existing FCoE standards.

26. The method of claim 25, wherein the suggested payload size that is larger than allowed by existing FCoE standards is defined in terms of a predefined mathematical formula based on the values held in the additional field and the conventional field.

27. The method of claim 26, wherein the additional field is associated with a default value, the default value being a value usually placed in that field by conventional devices, the predefined mathematical formula being such that if the default value is stored in the additional field, the predefined formula results in a payload size that is equal to the payload size stored by the conventional field.

28. A device connected to a Fibre Channel over Ethernet (FCoE) network including an FCoE fabric the device including circuitry configured to:
negotiate a frame size with a second device and the FCoE fabric, the negotiated frame size being larger than allowed by existing FCoE standards; and
communicate with the second device through the FCoE network using frames of the negotiated frame size.

29. The device of claim 28, wherein the circuitry includes application specific circuitry configured to perform the negotiating and communicating steps.

30. The device of claim 28, wherein the device includes a generally programmable processor and a memory including a plurality of instructions, the instructions being executable at the processor and configured to cause the processor to perform the negotiating and communicating steps.

31. A device connected to a Fibre Channel over Ethernet (FCoE) network including an FCoE fabric and including:
a processor;
a memory connected to the processor and including a plurality of computer executable instructions that are executable at the processor; and
a networking interface connected to the processor and the FCoE network,
wherein the computer executable instructions are such that when executed at the processor they cause the processor to
negotiate a frame size with a second device and the FCoE fabric, the negotiated frame size being larger than allowed by existing FCoE standards, and
communicate with the second device through the FCoE network using frames of the negotiated frame size.

32. The device of claim 31, wherein the device is a computer.

33. The device of claim 31, wherein the device is a storage device.

34. The storage device of claim 33, wherein the storage device is a RAID array.

35. A Fibre Channel over Ethernet (FCoE) network switch connected to an FCoE network and to a first and second devices through the FCoE network, the network switch being configured to:
negotiate a frame size with the first and second devices, the negotiated frame size being larger than allowed by existing FCoE standards; and
forward communications between the first and second devices, the communications including frames of the negotiated frame size.

36. A Fibre Channel over Ethernet (FCoE) network switch connected to an FCoE network and to a first and second devices through the FCoE network, the network switch including:
a processor;
a memory connected to the processor and including a plurality of computer executable instructions that are executable at the processor; and
a networking interface connected to the processor and the FCoE network,
wherein the computer executable instructions are such that when executed at the processor they cause the processor to
negotiate a frame size with the first and second devices, the negotiated frame size being larger than allowed by existing FCoE standards; and
forward communications between the first and second devices, the communications including frames of the negotiated frame size.

37. A non-transitory computer-readable medium comprising a plurality of instructions, the instructions being configured for execution at a device connected to a Fibre Channel over Ethernet (FCoE) network including an FCoE fabric, the instructions being further configured to cause the device to perform a method when executed at the device, the method comprising:
negotiating a frame size with a second device and the FCoE fabric, the negotiated frame size being larger than allowed by existing FCoE standards; and
communicating with the second device through the FCoE network using frames of the negotiated frame size.

38. A non-transitory computer-readable medium comprising a plurality of instructions, the instructions being configured for execution at a Fibre Channel over Ethernet (FCoE) network switch connected to an FCoE network and to a first and second devices through the FCoE network, the instructions being further configured to cause the network switch to perform the following as a result of execution of the instructions thereon:
negotiate a frame size with the first and second devices, the negotiated frame size being larger than allowed by existing FCoE standards; and
forward communications between the first and second devices, the communications including frames of the negotiated frame size.

* * * * *